United States Patent [19]

Kondo

[11] 4,051,398
[45] Sept. 27, 1977

[54] COIL MEANS FOR DRIVING A LINEAR MOTOR

[75] Inventor: Toshihiro Kondo, Chofu, Japan

[73] Assignees: Toshihiro Kondo, Tokyo; Fuji Film Co., Ltd., Minami-ashigara, both of Japan

[21] Appl. No.: 677,163

[22] Filed: Apr. 15, 1976

[30] Foreign Application Priority Data

Apr. 17, 1975 Japan ............................... 50-46704

[51] Int. Cl.² ........................................... H02K 33/00
[52] U.S. Cl. ........................................................ 310/12
[58] Field of Search ................. 310/DIG. 6, 12–14; 336/130

[56] References Cited

U.S. PATENT DOCUMENTS

| 3,136,934 | 6/1969 | Henry-Baudot | 310/12 |
| 3,353,131 | 11/1967 | Stubbs et al. | 310/134 |
| 3,903,437 | 9/1975 | Mori | 310/12 |

FOREIGN PATENT DOCUMENTS 290,354   6/1965   Netherlands ........................ 310/17

OTHER PUBLICATIONS

*IBM Tech. Disclosure Bulletin,* "Printed Circuit Coil" Styles, vol. 15, No. 1, June, 1972.

*Primary Examiner*—Donovan F. Duggan
*Attorney, Agent, or Firm*—Fleit & Jacobson

[57] ABSTRACT

A series of thin electromagnetic print coils of rectangular shape are arranged in a line overlapped with each other in which each coil is slightly offset from the preceding coil, and are molded together with a plastic material to form a thin elongated coil group. The coil group is bent into the shape of rectangular or rounded "U" to guide therealong a movable member carrying therewith a permanent magnet. Preferably, longitudinally extending parts of windings of the coils are bent outward at right angles to the remaining part of the windings.

10 Claims, 10 Drawing Figures

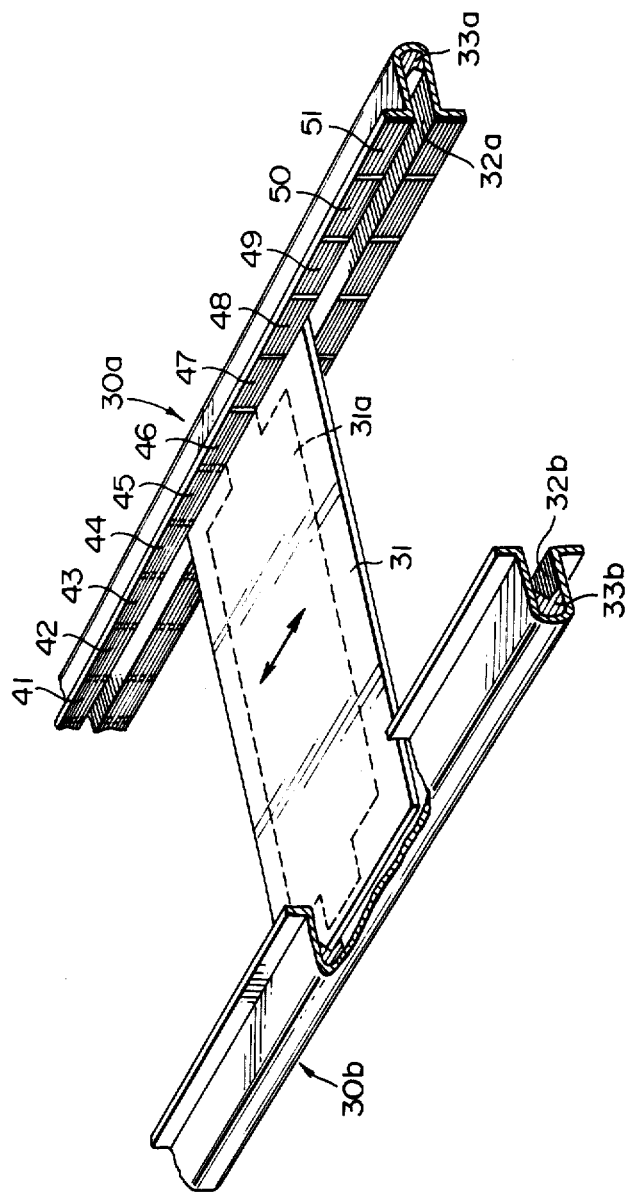

COIL MEANS FOR DRIVING A LINEAR MOTOR

BACKGROUND OF THE INVENTION

1. Field of the Invention

This invention relates to a coil means for driving a linear motor, and more particularly to a coil means for a linear motor which has a function to effectively guide a movable member as well as to move the same by electromagnetic force.

2. Description of the Prior Art

It has been known in the art to drive a movable member carrying therewith a permanent magnet along a guide means by electromagnetic force created between the permanent magnet and a series of electromagnets arranged along the guide means. The linear motor employing the series of electromagnets has a defect in that the construction of the electromagnets arranged in a line is very complicated and occupies a large space. Further, it is desirable to give electromagnetic force to the permanent magnet from both sides thereof to effectively drive the movable member. However, in view of the construction of the series of the conventional electromagnets, it is very difficult to provide the series of electromagnets on both sides of the movable member.

SUMMARY OF THE INVENTION

In view of the above observations of the conventional linear motor, it is the primary object of the present invention to provide a coil means for driving a movable member in a linear motor which is simple in structure and small in size.

Another object of the present invention is to provide a series of coils which are capable of giving electromagnetic force to a permanent magnet carried on a movable member from both sides thereof.

Still another object of the present invention is to provide a series of electromagnetic coils for driving a movable member carrying therewith a permanent magnet which coils are also effective as a guide means for guiding the movable member therealong.

The series of coils in accordance with the present invention comprises a number of thin electromagnetic print coils of rectangular shape arranged in a line each of which is slightly offset in its longer direction from the preceding coil to form as a whole a thin elongated magnetic coil group. The elongated magnetic coil group is molded integral with a plastic sheet and then is bent into the shape of angular or rounded "U" to form a guide for a movable member. The movable member carries a permanent magnet therein and is guided along the U-shaped coil group when the series of coils are energized successively from one at one end thereof to the one at the other end. Since the bent portion of the coils forming the U-shaped part faces to the permanent magnet carried in the movable member from both sides thereof, the electromagnetic force acting on the movable member is doubled. Further, since the coils are molded in a piece with a plastic material, the structure thereof is very simple and it is easy to mount the coils in the device which utilizes the linear motor.

BRIEF DESCRIPTION OF THE DRAWING

FIG. 8 is a perspective view of an embodiment of a linear motor employing the coil means as shown in FIGS. 7A and 7B.

DESCRIPTION OF THE PREFERRED EMBODIMENTS

Figure 1A:
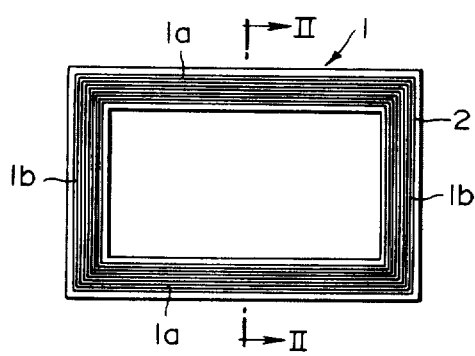
FIG. 1A is a front view showing an example of a thin electromagnetic print coil which is used in the linear motor driving coil means in accordance with the present invention.
Figure 1B:
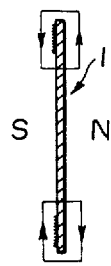
FIG. 1B is a vertical sectional view thereof.
Figure 2:
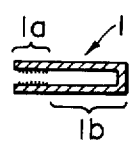
FIG. 2 is a cross-sectional view of the thin coil which is bent into the shape of rectangular "U,"

Now referring to FIGS. 1A and 1B, a print coil 1 is made by vacuum evaporation of silver, copper and the like on a plastic sheet 2 as of polyester sheet and photo-etching thereof. The print coil 1 is of rectangular shape as shown in FIG. 1A and produces a magnetic field as shown in FIG. 1B, for instance. By bending the coil 1 in the form of rectangular or rounded "U" as shown in FIG. 2, one polarity is formed within the bent coil 1 and the opposite polarity is formed outside the coil 1. The coil 1 effects to move a permanent magnet sheet located in the bent portion thereof in one direction along the bent line thereof (perpendicular to the drawing sheet). The upper and lower part 1a of the windings of the print coil 1 work to move the permanent magnet to the right in FIG. 2 when N-pole of the permanent magnet is located within the bent portion of the coil 1. The side parts 1b (FIG. 1A) of the print coil 1 extending perpendicular to the direction of travel of the movable member only effect to move the movable member in the direction perpendicular to the drawing sheet in FIG. 2. The opposite side parts 1b, 1b are effective to move the same pole of the permanent magnet in opposite directions.

Figure 3:
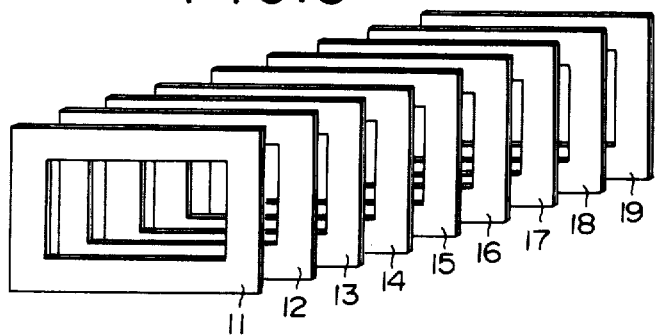
FIG. 3 is a perspective view showing how the coils are arranged.
Figure 4:
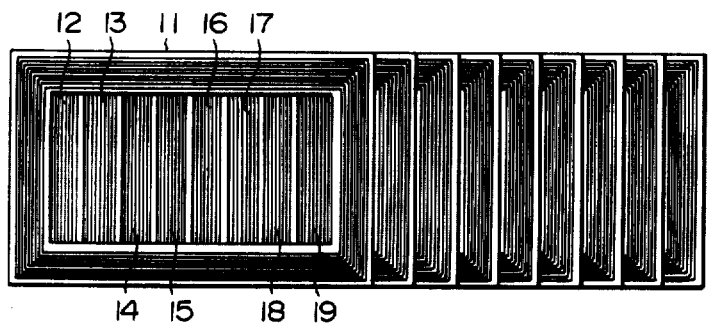
FIG. 4 is a front view of the coils arranged in a line partially overlapped with each other to form an elongated coil group molded together with a plastic material.

The linear motor driving coil means in accordance with the present invention comprises a number of print coils as shown in FIG. 1A arranged in a line partially overlapped with each other so that each coil is slightly offset in its longer direction from the preceding coil as shown in FIGS. 3 and 4. The coils 11 to 19 arranged in a line in FIG. 3 are molded into a piece of elongated magnetic coil group together with a plastic material such as polyester resins into a shape as shown in FIG. 4.

Figure 5:
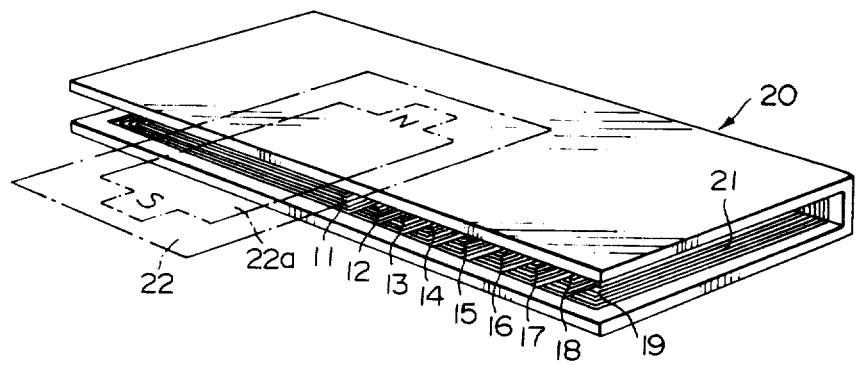
FIG. 5 is a perspective view showing an embodiment of the coil means for driving a movable member based on a linear motor principle in accordance with the present invention.

One embodiment of the linear motor driving coil means is shown in FIG. 5 wherein a coil group 20 is bent into a U-shape. The coil group 20 comprises rectangular coils 11 to 19 which are independently energizable in accordance with the position of a permanent magnet 22a carried in a movable sheet 22. The movable sheet 22 carrying the permanent magnet 22a can be guided to move along in the space 21 of the coil group 20 by means of a separate guide means or can be guided by the coil group 20 itself if the coil group 20 is provided on the bottom thereof with a guide rail 23 made of nylon, polycarbonate or the like as shown in FIG. 6.

Figure 6:
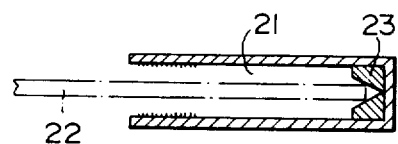
FIG. 6 is a cross-sectional view showing another embodiment of the present invention.

In the above described embodiments as shown in FIGS. 5 and 6, the longitudinally extending parts of the windings of the coil which correspond to said upper and lower parts 1a of the windings shown in FIGS. 1A and 2 would undesirably effect to move the movable member 22 transversely of the direction of travel thereof. Therefore, it is desirable to make the longitudinally extending parts of the coils 11 to 19 ineffective upon the permanent magnet 22a. One embodiment of the invention in which the undesirable parts of the coils is made ineffective upon the permanent magnet 22a will now be described with reference to FIGS. 7A and 7B.

Figure 7A:
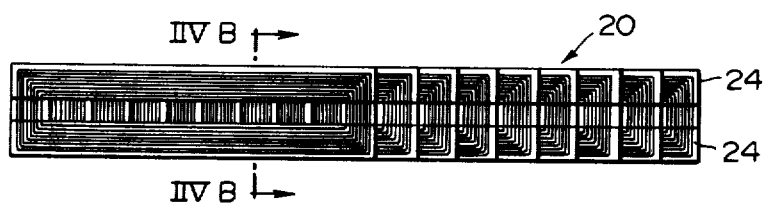
FIG. 7A is a front view showing a further different embodiment of the present invention.
Figure 7B:
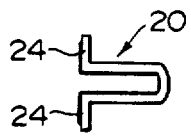
FIG. 7B is a side view of the embodiment as shown in FIG. 7A.

Referring to FIGS. 7A nd 7B, the undesirably effecting parts 24 of the coil group 20 are bent at right angles outward to the remaining parts thereof. The coil group 20 may be bent after it is molded or may be molded into the bent form when molding.

An example of an application of the linear motor employing the above described preferred embodiment of the coil means in accordance with the present invention will now be described with reference to FIG. 8. A pair of coil groups 30a and 30b are provided in parallel to each other to form a guiding and driving means to move an optical blade member 31 carrying therein a sheet-like permanent magnet 31a. The coil group 30a includes print coils 41 to 51 and is provided on the bottom thereof with a guide rail 33a. The other coil group 30b is also provided with a guide rail 33b. The guide rails 33a and 33b guide opposite ends of the blade member 31 therealong. The operation and function of the coil groups 30a and 30b will be apparent to those skilled in the art from the foregoing description of the embodiments, and accordingly the detailed explanation thereof will be omitted here. The coil groups 30a and 30b may not be straight in form and can be, for instance, curved. Further, the cross-section of the coil means 30a and 30b may not necessarily be U-shaped, but may be C-shaped or Ω-shaped. Such various shapes are referred to simply as "U-shape " in this specification for convenience.

I claim:

1. A coil means for driving a movable member in a linear motor system comprising a series of electromagnetic coils arranged in a line along a path in which the movable member travels, and energized successively from one at one end thereof to the one at the other end in the direction of movement of the movable member, said series of electromagnetic coils being in the form of thin coils and arranged in a line partially overlapped with each other and fixed together to form an elongated one-piece coil group, and said coil group having a cross-section of a shape of "U" to guide the movable member therein.

2. A coil means for driving a movable member as defined in claim 1 wherein said coils are rectangular thin coils.

3. A coil means for driving a movable member as defined in claim 2 wherein said coils are print coils each consisting of a plastic substrate and a print coil deposited thereon.

4. A coil means for driving a movable member as defined in claim 3 wherein said coils comprise vacuum evaporated, photoetched conductive material.

5. A coil means as defined in claim 4 wherein said conductive material is copper.

6. A coil means as defined in claim 4 wherein said conductive material is silver.

7. A coil means for driving a movable member as defined in claim 2 wherein a part of windings of the rectangular coils extending in the direction of travel of the movable member is bent at right angles outward with respect to the remaining part thereof.

8. A coil means for driving a movable member as claimed in claim 1 wherein the curved portion of said "U" shaped coil group cross-section lies substantially in the middle of each of said electromagnetic coils and the leg portions of the "U" shaped coil group are substantially equal in length.

9. A coil means for driving a movable member as claimed in claim 1 further comprising a guide rail means mounted at the curved portion of said "U" shaped coil group cross-section for guiding said movable member.

10. A coil means for driving a movable member as claimed in claim 1 further comprising a movable member, said movable member comprising a permanent magnet.

* * * * *